United States Patent
Auguste et al.

(10) Patent No.: US 8,724,283 B1
(45) Date of Patent: May 13, 2014

(54) A.C. POWER LINE SURGE PROTECTORS

(75) Inventors: Donna M. Auguste, Denver, CO (US); David E. Hayes, Denver, CO (US); Klaus J. Dimmler, Colorado Springs, CO (US); Alan D. DeVilbiss, Colorado Springs, CO (US)

(73) Assignee: Alpha and Omega, Inc., Denver, CO (US)

( * ) Notice: Subject to any disclaimer, the term of this patent is extended or adjusted under 35 U.S.C. 154(b) by 0 days.

(21) Appl. No.: 13/341,983

(22) Filed: Dec. 31, 2011

Related U.S. Application Data

(60) Provisional application No. 61/429,043, filed on Dec. 31, 2010.

(51) Int. Cl.
*H02H 3/22* (2006.01)

(52) U.S. Cl.
USPC .......................................................... 361/111

(58) Field of Classification Search
USPC .......................................................... 361/111
See application file for complete search history.

(56) References Cited

U.S. PATENT DOCUMENTS

| | | | | |
|---|---|---|---|---|
| 3,840,781 A | * | 10/1974 | Brown | 361/58 |
| 4,089,032 A | * | 5/1978 | Dell Orfano | 361/56 |
| 4,677,518 A | * | 6/1987 | Hershfield | 361/56 |
| 4,807,083 A | * | 2/1989 | Austin | 361/111 |
| 4,925,396 A | * | 5/1990 | Grover | 439/147 |
| 5,590,010 A | * | 12/1996 | Ceola et al. | 361/93.4 |
| 5,761,021 A | * | 6/1998 | Yu | 361/111 |
| 5,790,359 A | * | 8/1998 | Kapp et al. | 361/106 |
| 6,011,682 A | * | 1/2000 | Storey | 361/117 |
| 6,122,157 A | * | 9/2000 | Gerlach | 361/124 |
| 6,149,288 A | * | 11/2000 | Huang | 362/545 |
| 6,252,754 B1 | * | 6/2001 | Chaudhry | 361/111 |
| 6,282,075 B1 | * | 8/2001 | Chaudhry | 361/111 |
| 6,775,121 B1 | * | 8/2004 | Chaudhry | 361/111 |
| 7,242,566 B2 | * | 7/2007 | Yegin et al. | 361/111 |
| 7,333,316 B1 | * | 2/2008 | Norris | 361/111 |
| 7,508,643 B2 | * | 3/2009 | Shreiner et al. | 361/119 |
| 7,616,420 B2 | * | 11/2009 | Slater et al. | 361/91.1 |
| 8,233,301 B1 | * | 7/2012 | Guo | 363/140 |
| 8,441,769 B2 | * | 5/2013 | Ausch | 361/119 |
| 2002/0115329 A1 | * | 8/2002 | Collin et al. | 439/275 |
| 2006/0279885 A1 | * | 12/2006 | Sung et al. | 361/42 |
| 2008/0096429 A1 | * | 4/2008 | Mikolajczak et al. | 439/620.08 |
| 2010/0020452 A1 | * | 1/2010 | Gandolfi | 361/42 |

\* cited by examiner

*Primary Examiner* — Ronald W Leja
(74) *Attorney, Agent, or Firm* — TIPS Group

(57) ABSTRACT

In an embodiment, set forth by way of example and not limitation, a power line surge protector circuit includes a first input node, a second input node, a first output node and a second output node; a semiconductor shunt having an avalanche breakdown potential, the shunt being coupled between the first input node and the second input node, whereby a voltage potential between the first input node and the second input node which is in excess of the avalanche breakdown potential shunts current between the first input node and the second input node; and a resettable circuit breaker coupled between the first input node and the shunt.

32 Claims, 4 Drawing Sheets

A.C. POWER LINE SURGE PROTECTORS

CROSS REFERENCE TO RELATED APPLICATION

This application claims the benefit of U.S. Ser. No. 61/429,043, filed Dec. 31, 2010, which is incorporated herein by reference in its entirety.

BACKGROUND

A surge protector (or surge suppressor) is a circuit designed to protect electrical devices from damaging electrical overvoltage conditions. A surge protector regulates the power applied to an electric device by either blocking or by shunting currents that are above a safe threshold.

Surge protectors are often used to protect sensitive electronic devices. For example, surge protectors may be provided in A.C. power strips or in rack-mounted power supplies for computer systems. Providing a surge protector in a compact format is relatively rare, however, due to the difficulty of handling large, transient surges with small electrical and/or electronic devices.

In U.S. Pat. No. 4,907,118 a plug-type surge protector is described having a metal oxide varistor which is visible through the plug body. In response to an overload condition, the varistor acts as a one-time fuse to prevent damage to a protected electronic apparatus. The surge protector must then be replaced after it served its purpose.

In U.S. Pat. No. 4,862,311 an overvoltage protector for use with data cables is described which uses a bipolar silicon avalanche diode for surge protection. However, the apparatus of Rust et al. is designed for the relatively low voltages and currents carried by data cables and is not well suited for surge protection of A.C. power lines.

These and other limitations of the prior art will become apparent to those of skill in the art upon a reading of the following descriptions and a study of the several figures of the drawing.

SUMMARY

In an embodiment, set forth by way of example and not limitation, an embedded A.C. power line surge protector includes a power line electrical component comprising a first input node, a second input node and an insulating member at least partially housing the first input node and the second input node; a bidirectional TVS diode coupled between the first input node and second neutral node and housed within the insulating member; and a resettable circuit breaker coupled between the bidirectional TVS diode and the first input node, the resettable circuit breaker being housed within the insulating member.

In an alternate embodiment, set forth by way of example and not limitation, the power line electrical component also includes a first output node and a second output node. In another alternate embodiment, set forth by way of example and not limitation, the first input node is electrically connected to the first output node, the second input node is electrically connected to the second output node, and the bidirectional TVS diode is coupled in series with the resettable circuit breaker between the first input node and the second input node. In another alternate embodiment, set forth by way of example and not limitation, the insulating member is a gasket configured to engage prongs of a power plug. In another alternate embodiment, set forth by way of example and not limitation, the resettable circuit breaker couples the first input node to the first output node, the second input node is electrically connected to the second output node, and the bidirectional TVS diode couples the first output node to the second output node. In another alternate embodiment, set forth by way of example and not limitation, there is at least one electronic component coupled in parallel to the bidirectional TVS diode and housed within the insulating member.

In an embodiment, set forth by way of example and not limitation, the power line electrical component comprises a plug. In another embodiment, set forth by way of example and not limitation, the power line electrical component comprises a socket. In another embodiment, set forth by way of example and not limitation, the power line electrical component comprises a power cord. In another embodiment, set forth by way of example and not limitation, the first input node is one of a line power node and a line neutral node and the second input node is the other of the line power node and the line neutral node. In another embodiment, set forth by way of example and not limitation, a current limiter is provided in series with the bidirectional TVS diode. By way of non-limiting example, the current limiter may be a resistor.

In an embodiment, set forth by way of example and not limitation, a power line surge protector circuit includes a first input node, a second input node, a first output node and a second output node; a semiconductor shunt having an avalanche breakdown potential, the shunt being coupled between the first input node and the second input node, whereby a voltage potential between the first input node and the second input node which is in excess of the avalanche breakdown potential shunts current between the first input node and the second input node; and a resettable circuit breaker coupled between the first input node and the shunt.

In an embodiment, set forth by way of example and not limitation, the shunt comprises a TVS diode. In an embodiment, set forth by way of example and not limitation, the shunt comprises a pair of unidirectional TVS diodes. In an embodiment, set forth by way of example and not limitation, a power line protector circuit comprises a bidirectional TVS diode. In an embodiment, set forth by way of example and not limitation, the resettable circuit breaker is a solid state device. In an embodiment, set forth by way of example and not limitation, the solid state device is a polymeric positive temperature coefficient (PPTC) resettable fuse.

In an embodiment, set forth by way of example and not limitation, a surge protection method includes shunting between a first input node and a second input node with a semiconductor device when a voltage potential across the semiconductor device exceeds an avalanche breakdown potential of the semiconductor device; and opening a connection between the a first input node and the semiconductor device with a resettable circuit breaker when a current flowing through the circuit breaker exceeds a circuit breaker trip current.

In an embodiment, set forth by way of example and not limitation, the semiconductor device comprises a TVS diode. In an embodiment, set forth by way of example and not limitation, the TVS diode is a bidirectional TVS diode. In an embodiment, set forth by way of example and not limitation, the resettable circuit breaker comprises a polymeric positive temperature coefficient device.

In an embodiment, set forth by way of example and not limitation, an A.C. plug adaptor with integrated surge protector includes an adaptor body provided with a first electrical socket, a second electrical socket, a first electrical prong and a second electrical prong; a polymeric positive temperature coefficient (PPTC) resettable fuse connecting the first electrical socket to the first electrical prong; and a bidirectional TVS diode connected between the first electrical socket and the second electrical socket. In an alternate embodiment, set forth by way of example and not limitation, an electronic circuit includes at least one electronic device connected in parallel with the bidirectional TVS diode between the first electrical socket and the second electrical socket.

In an embodiment, set forth by way of example and not limitation, an A.C. plug with integrated surge protector includes a plug body provided with a first electrical contact, a second electrical contact, a first electrical prong and a second electrical prong; a polymeric positive temperature coefficient (PPTC) resettable fuse connecting the first electrical contact to the first electrical prong; and a bidirectional TVS diode connected between the first electrical contact and the second electrical contact. In an alternate embodiment, set forth by way of example and not limitation, an electronic circuit having at least one electronic device is connected in parallel with the bidirectional TVS diode between the first electrical contact and the second electrical contact.

In an embodiment, set forth by way of example and not limitation, an A.C. socket with integrated surge protector includes a socket body provided with a first electrical socket, a second electrical socket, a first electrical contact and a second electrical contact; a polymeric positive temperature coefficient (PPTC) resettable fuse connecting the first electrical socket to the first electrical contact; and a bidirectional TVS diode connected between the first electrical socket and the second electrical socket. In an alternate embodiment, set forth by way of example and not limitation, an electronic circuit having at least one electronic device is connected in parallel with the bidirectional TVS diode between the first electrical socket and the second electrical socket.

In an embodiment, set forth by way of example and not limitation, an A.C. power cord with integrated surge protector includes a power cord comprising a first wire and a second wire; a polymeric positive temperature coefficient (PPTC) resettable fuse connected in series with the first wire; and a bidirectional TVS diode connected between the first wire and the second wire. 30. In an alternate embodiment, set forth by way of example and not limitation, an electronic circuit having at least one electronic device is connected in parallel with the bidirectional TVS diode.

In an embodiment, set forth by way of example and not limitation, an A.C. plug gasket with integrated surge protector includes a gasket body provided with a first electrical contact and a second electrical contact; a polymeric positive temperature coefficient (PPTC) resettable fuse and a bidirectional TVS diode coupled in series between the first electrical contact and the second electrical contact. In an alternate embodiment, set forth by way of example and not limitation, an electronic circuit having at least one electronic device connected in parallel with the bidirectional TVS diode.

These and other embodiments and other features disclosed herein will become apparent to those of skill in the art upon a reading of the following descriptions and a study of the several figures of the drawing.

BRIEF DESCRIPTION OF THE DRAWINGS

Several examples will now be described with reference to the drawings, wherein like components are provided with like reference numerals. The examples are intended to illustrate, but not to limit, the invention. The drawings include the following figures.

DETAILED DESCRIPTIONS

Figure 1:
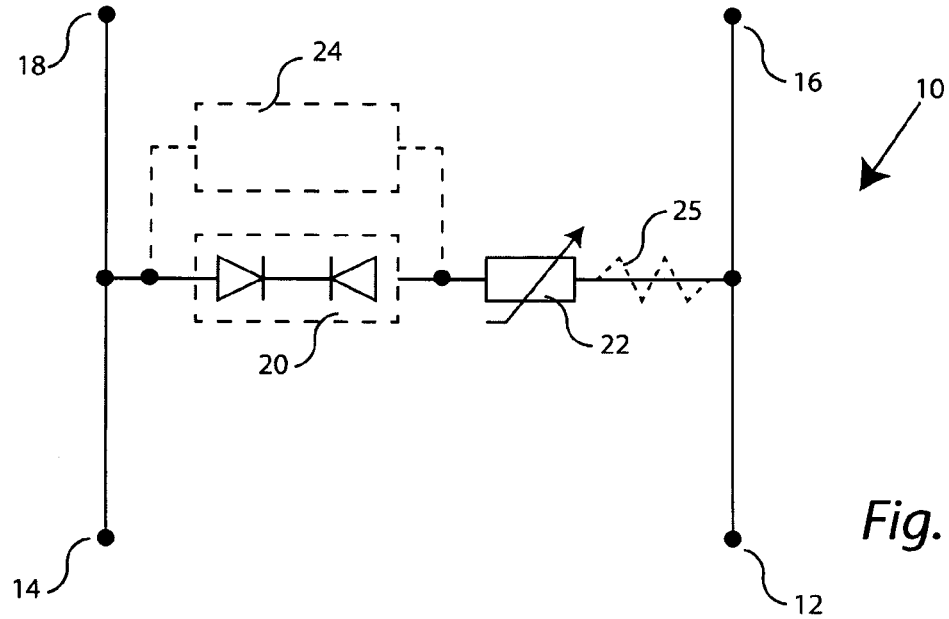
FIG. 1 is a schematic of an example embedded A.C. power line surge protector circuit.

FIG. 1 is a schematic diagram of power line surge protector circuit 10, set forth by way of example and not limitation. The example surge protector circuit 10 includes a first input node 12, a second input node 14, a first output node 16 and a second output node 18. The surge protector circuit 10 also includes, by way of non-limiting examples, a semiconductor shunt 20, a resettable circuit breaker 22 and, optionally, circuitry 24 including at least one electronic component. The surge protector circuit 10 may also include an optional current limiter 25, such as a resistor or other current limiting device, to limit the amount of current that can flow through semiconductor shunt 20.

In this example, first input node 12 is electrically connected to first output node 16 and second input node 14 is electrically connected to second output node 18. Semiconductor shunt 20 and resettable circuit breaker 22 are coupled in series between first input node 12 and second input node 14. Optional circuitry 24 is, in this example, coupled in parallel to semiconductor shunt 20.

In these descriptions, the term "electrically connected" has the meaning of a substantially equipotential electrical connection, such as by a wire, an electrical trace or the like. The word "coupled" and the like, as used herein, includes "electrically connected" but also includes indirect electrical connections, such as through one or more electrical components or devices.

In this example, first input node 12 and second input node 14 may be operationally coupled to an AC or "line" power source. The first output node 16 and second output node 18 may be operationally to a device needing line power, such as an electronic device or an appliance.

In the U.S., an A.C. power line or "line power source" is at approximately 120 VAC. The line power source includes a power or "hot" line and a neutral line. The line power source also often includes a ground line (not shown in this figure).

Line power sources are subject to transient voltage spikes, also known as "surges", due to such factors as lighting strikes, load shifting of the A.C. power lines, electrical arcing in motors, etc. These surges can be very disruptive and even destructive to sensitive equipment. Example power line surge protectors as set forth herein are designed to reduce the damage caused by surges on the power line.

The semiconductor shunt 20, in this non-limiting example, comprises a transient voltage suppression (TVS) diode. A TVS diode operates by shunting excess current when the induced voltage across the diode exceeds its avalanche breakdown potential ("breakdown voltage"). Furthermore, a TVS diode is advantageously a clamping device, suppressing overvoltages above its breakdown voltage. As a "clamping device," it automatically resets when the overvoltage goes away.

A TVS diode may be either unidirectional or bidirectional. A unidirectional device operates as a rectifier in the forward direction like any other avalanche diode, but is typically made and tested to handle very large peak currents. A bidirectional. transient voltage suppression diode can be represented by two mutually opposing avalanche diodes in series with one another. While this representation is schematically accurate, physically the devices may also be manufactured as a single component.

A TVS diode can respond to over-voltages faster than other common over-voltage protection components such as varistors or gas discharge tubes. The actual clamping occurs in roughly one picosecond, but in a practical circuit the inductance of the wires leading to the device imposes a higher limit. This makes transient voltage suppression diodes useful for protection against very fast and often damaging voltage transients such as power line surges.

There are a number of sources for TVS diodes. One example is Littlefuse, Inc. of Chicago, Ill. which proves a surface-mount, bidirectional TVS diode having dimensions of about 6 mm×8 mm×2.6 min as part #5.0SMDJ170A.

The term "resettable circuit breaker," as used herein, refers to a device which can perform the function of a circuit breaker switch, e.g. to "open" when a current flowing through the device exceeds a trip current and which can be "closed" when after the overcurrent condition has been resolved. By "open", it is meant that the impedance of the device is high and by "Closed" it is meant that the impedance of the device is low.

Resettable circuit breakers can be manually reset or may be automatically reset when the overcurrent condition has been resolved. Automatically resettable circuit breakers are often solid-state devices which use the electric, magnetic or optical properties of a solid to control current without the need for moving parts.

One type of solid state automatically resettable circuit breaker is known as a polymeric positive temperature coefficient (PPTC) device (referred to herein as a "resettable fuse"). A PPTC device is a type of non-linear thermistor which cycles back to a conductive state after the trip current is removed, allowing the circuit to function again without opening the chassis or replacing anything. An advantage of a resettable fuse is that, even in its "closed" state, it exhibits a significant resistance, which serves as a current limiter. That is, if a resettable fuse or other variable resistance resettable circuit breaker 22 is used, the optional current limiter 25 may not be required, since the current limiting function is performed by the resettable fuse. Of course, if additional current limitation is required, current limiter 25 may still be provided. Also, when the resettable fuse is in its "open" state, some current can still flow through the fuse to power, for example, optional circuitry 24.

A PPTC device has a current rating. When the current flowing through the device, (which has a small resistance in the on state) exceeds the current limit, the PPTC device warms up above a threshold temperature and the electrical resistance of the PPTC device suddenly increases several orders of magnitude to a "tripped" state where the resistance will typically be hundreds or thousands of ohms, greatly reducing the current. The rated trip current can be, for example, from about 20 mA to 100 A.

A polymeric PTC device comprises a non-conductive crystalline organic polymer matrix that is loaded with carbon black particles to make it conductive. While cool, the polymer is in a crystalline state, with the carbon forced into the regions between crystals, forming many conductive chains. Since it is conductive (the "initial resistance"), it will pass a given current, called the "hold current." If too much current is passed through the device (the "trip current") the device will begin to heat. As the device heats the polymer will expand, changing froth a crystalline into an amorphous state. The expansion separates the carbon particles and breaks the conductive pathways, causing the resistance of the device to increase. This will cause the device to heat faster and expand more, further raising the resistance. This increase in resistance substantially reduces the current in the circuit. A small current still flows through the device and is sufficient to maintain the temperature at a level which will keep it in the high resistance state.

When the power and fault are removed, the PPTC device will cool. As the device cools, it regains its original crystalline structure and returns to a low resistance state where it can hold the current as specified for the device. This cooling usually takes a few seconds, though a tripped device will retain a slightly higher resistance for hours, slowly approaching the initial resistance value.

There are a number of sources for resettable circuit breakers including, by way of non-limiting example, PPTC devices. For example, Bel Fuse, Inc. of Jersey City, N.J. provides a resettable fuse measuring 24.1 mm×16.5 mm×3 mm as part #0ZRA1000FF1A.

In the example of FIG. 1, the semiconductor shunt 20 may include a bidirectional TVS diode which is placed across the power supply to clamp the voltage. A the resettable circuit breaker 22 may include a resettable fuse, placed in series with the TVS diodes, to control the source impedance of power coming from the line. This, in effect, limits the current flowing into the bidirectional TVS diode, making the surge protection more reliable.

In the case of a power surge, the effective resistance of the resettable fuse increases as increased current flows through the fuse. A specification that must be considered is the amount of current that can flow through the resettable fuse under nominal conditions—that is, without tripping the fuse. Furthermore, since the resettable circuit breaker 22 is in series with the semiconductor shunt 20, in this example, it is preferable that its resistance be within a range sufficient to limit the current through the semiconductor shunt to safe levels during surge conditions while permitting current to flow through optional circuitry 24 during normal conditions. That is, in this non-limiting example, it is preferable that the resettable circuit breaker be a variable resistance device such as a resettable fuse which is never entirely "open" or "closed."

In the case of where there is optional circuitry 24 in a confined area such as a gasket (e.g. see FIGS. 3 and 4), the current that can be allowed to flow through the resettable fuse may be, by way of non-limiting example, as much as few hundred milliamps, since the circuitry 24 likely uses much less current than that. Furthermore, the surge protector circuit 10 will protect the optional circuitry 24 quite well, it should be noted that its ability to protect, for example, an appliance coupled to first output node 16 and second output node 18 is limited.

Figure 2:
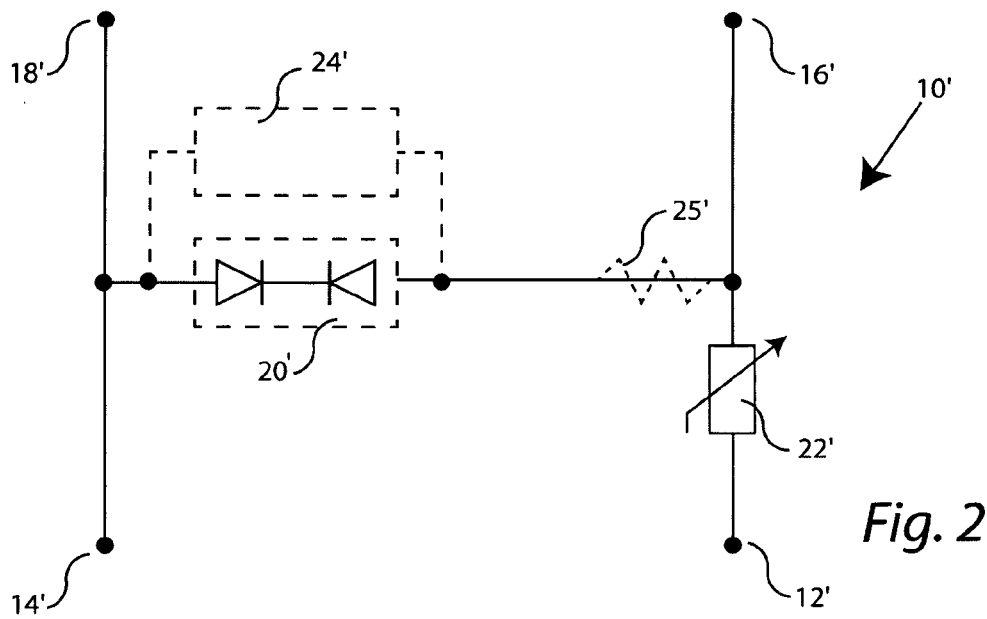
FIG. 2 is a schematic of another example of an embedded A.C. power line surge protector circuit.

FIG. 2 is a schematic diagram of power line surge protector circuit 10', set forth by way of example and not limitation. The example surge protector circuit 10' includes a first input node 12', a second input node 14', a first output node 16' and a second output node 18'. The surge protector circuit 10' also includes, by way of non-limiting examples, a semiconductor shunt 20', a resettable circuit breaker 22' and, optionally, circuitry 24' including at least one electronic component. The surge protector circuit 10' may also include an optional current limiter 25', such as a resistor or other current limiting device as described above, to limit the amount of current that can flow through semiconductor shunt 20'.

In this example, first input node 12' coupled to first output node 16' by resettable circuit breaker 22' and second input node 14' is electrically connected to first output node 18'. Semiconductor shunt 20' is coupled between first output node 16' and second output node 18'. Optional circuitry 24' is, in this example, coupled in parallel to semiconductor shunt 20'. The components chosen in the examples are similar, as noted by their similar reference numerals.

As with example power line surge protector 10, the power line surge protector 10' can be implemented with a variety of components. In these non-limiting examples, bidirectional TVD diodes and PPTC resettable fuses perform admirably, but other components and combinations may also be used, as will be appreciated by those of skill in the art.

Figure 5:
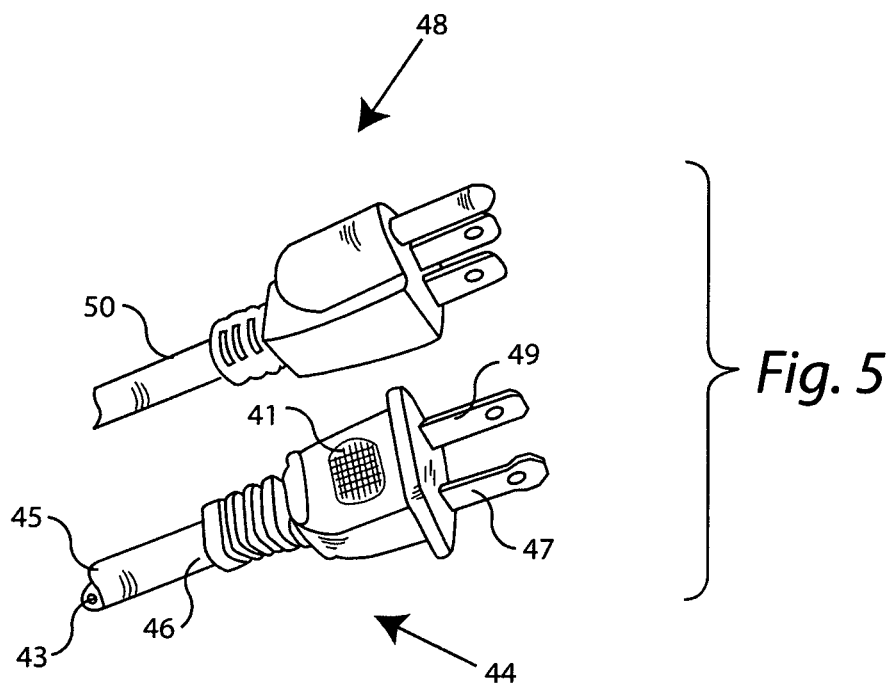
FIG. 5 is a perspective view of two examples of embedded A.C. power line surge protector power plugs and cords.
Figure 6:
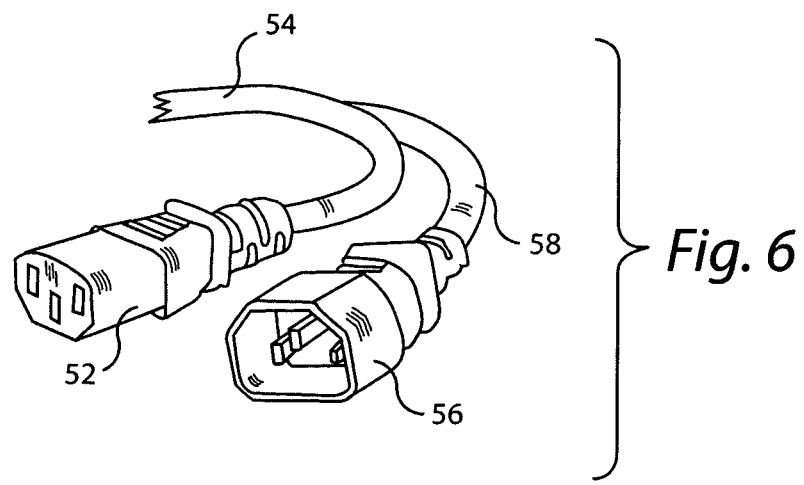
FIG. 6 is a perspective view of two examples of embedded A.C. power line surge protector computer power plugs and cords.
Figure 7:
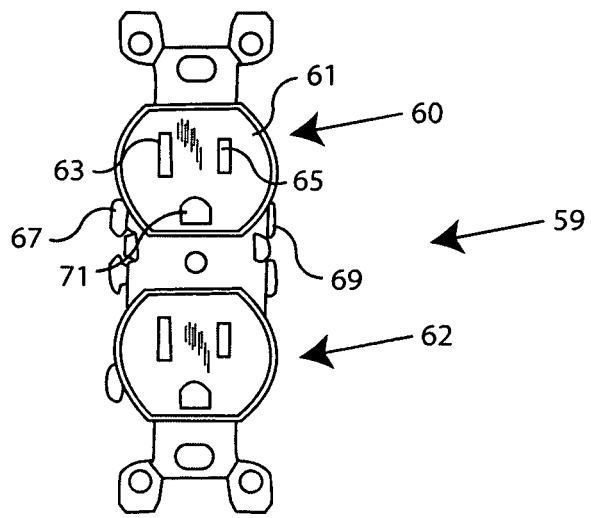
FIG. 7 is a perspective view of an example of an embedded A.C. power line surge protector dual-outlet socket.

With example power line surge protector 10', the resettable circuit breaker 22 is placed in series with the power connection to an appliance coupled to the output nodes 16' and 18'. The nominal operating current of the resettable circuit breaker 22 must be sufficiently high to support the needs of the appliance, e.g. at least 5 amperes ("amps") for an appliance rated for 5 amps, at least 10 amps for an appliance rated for 10 amps, etc. For such applications, the components of the power line surge protector 10' are likely too large for small form factors such as the gaskets shown in FIGS. 3 and 4, but quite practical for embodiments as illustrated in FIGS. 5-7.

Figure 3:
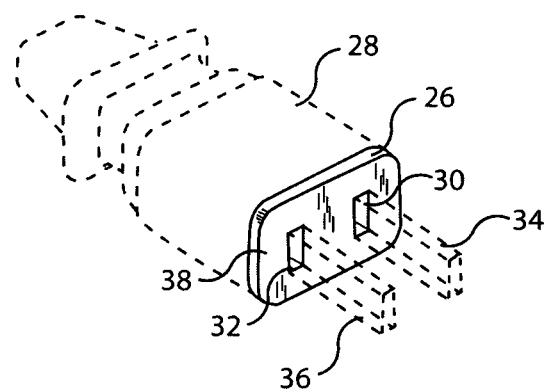
FIG. 3 is a perspective view of an example embedded A.C. power line surge protector gasket configured to engage prongs of a power plug.

FIG. 3 is a perspective view of an embedded A.C. power line surge protector gasket 26 and an electric plug (shown in phantom). The gasket 26 is provided with two electrical contacts 30 and 32 which may engage the prongs 34 and 36, respectively, of the electric plug 28. In this non-limiting example, contact 30 is the neutral contact and contact 32 is the hot contact.

As used herein, a "power line electrical component" includes a component or structure which is associated with a power line connection. By way of non-limiting examples, a power line electrical component may include a gasket, a plug, a socket, a connector, a wire, a cable or an electrical cord or combinations thereof. Certain embodiments, set forth by way of example and not limitation, of power line electrical components will be described below with reference to FIGS. 3-7.

The example gasket 26 of FIG. 3 may advantageously include the power line surge protector circuit 10 of FIG. 1. In this example, the input node 12 and output node 16 are equipotential, as are the input node 14 and output node 18. By way of non-limiting examples, nodes 12/16 may comprise contact 30 and nodes 14/18 may comprise contact 32 or vice versa.

With further reference to the examples of FIGS. 1 and 3, the shunt 20, resettable circuit breaker 22 and optional circuitry 24 may be at least partially housed within an insulating member 38. The insulating member 38 may conveniently be manufactured from a number of materials including plastic, synthetic rubber, ceramics and other suitable materials, as will be appreciated by those of skill in the art. The insulating member 38 may also be assembled from two or more components, or may be formed as a single piece, e.g. by injection molding.

With continuing reference to the examples of FIGS. 1 and 3, an A.C. plug gasket 26, set forth by way of example and not limitation, includes a gasket body (insulating member) 38 provided with a first electrical contact 30 and a second electrical contact 32. A polymeric positive temperature coefficient (PPTC) resettable fuse and a bidirectional TVS diode may be coupled in series between the first electrical contact 30 and the second electrical contact 32 in this example. Optional circuitry 24 may be connected in parallel with the bidirectional TVS diode.

Figure 4:
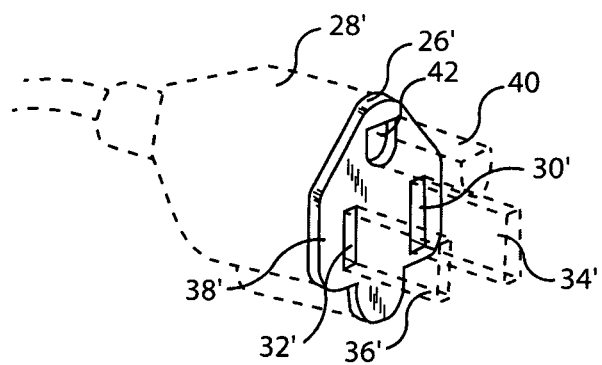
FIG. 4 is a perspective view of another example embedded A.C. power line surge protector gasket configured to engage prongs of a power plug.

FIG. 4 is a perspective view of an embedded A.C. power line surge protector gasket 26' and an electric plug 28' (shown in phantom). The gasket 26' is provided with two electrical contacts 30' and 32' which engage the prongs 34' and 36', respectively, of the gasket 26'. In this non-limiting example, contact 30' is the neutral contact and contact 32' is the hot contact. Electric plug 28' also includes a ground prong 40 which is accommodated by an aperture 42 in gasket 26'. Aperture 42 may or may not include an electrical contact depending upon the embodiment.

The example gasket 26' of FIG. 4 may advantageously also include the power line surge protector circuit of FIG. 1. In this example, the input node 12' and output node 16' are equipotential, as are the input node 14' and output node 18'. By way of non-limiting examples, nodes 12'/16' may comprise contact 30' and nodes 14'/18' may comprise contact 32' or vice versa.

With further reference to the examples of FIGS. 1 and 4, the shunt 20, resettable circuit breaker 22 and optional circuitry 24 may be at least partially housed within an insulating member 38'. The insulating member 38' may conveniently be manufactured from a number of materials including plastic, synthetic rubber, ceramics and other suitable materials, as will be appreciated by those of skill in the art. The insulating member 38' may also be assembled from two or more components, or may be formed as a single piece, e.g. by injection molding.

FIG. 5 illustrates additional power line electrical components, in this case A.C. power plugs and cords. For example, a two-prong electric plug 44 (with or without an attached power cord 46) and a three-prong electric plug 48 (with or without an attached power cord 50), are further non-limiting examples of power line electrical components.

The embedded A.C. power line circuitry 10 of FIG. 1 or 10' of FIG. 2 may be suitable for use with either or both of electric plugs 44 and 48 and/or power cords 46 and 50 (potentially with the use of a dongle, not shown). The power line circuitry 10' may fit within plug 44 and/or plug 48 providing additional surge protection for an appliance drawing power from those plugs. The plugs include insulating members made from plastic, synthetic rubber, ceramics and other suitable materials, as will be appreciated by those of skill in the art, which at least partially house the circuitry 10'.

By way of non-limiting example, A.C. plug 44 with integrated surge protector includes plug body 41 having a first electrical contact 43 (e.g. one wire of the power cord 46), a second electrical contact 45 (e.g. another wire of the power cord 46), a first electrical prong 47 and a second electrical prong 49. Disposed within the plug body 41, in this example, is a polymeric positive temperature coefficient (PPTC) resettable fuse (not seen) connecting the first electrical contact 43 to the first electrical prong 47 and a bidirectional TVS diode (not seen) connected between the first electrical contact 43 and the second electrical contact 45. The surge protector circuit 10' of FIG. 2 is applicable to this example.

It will be appreciated that the connection of the resettable fuse can also, in another example, be provided between the second electrical contact 45 and the second electrical prong 49 in addition or instead of the previously discussed connection. That is, circuit 10' of FIG. 2 operates regardless of the polarity of the power line. It will also be appreciated that an optional electronic circuit (not seen) including at least one electronic device may be disposed within the plug body 41 and coupled in parallel with the bidirectional TVS diode.

In another example, the surge protector can be provided within an A.C. power cord, such as power cord 46 of FIG. 5, having a first wire 43 and a second wire 45. By way of non-limiting example, a polymeric positive temperature coefficient (PPTC) resettable fuse (not seen) can be connected in series with one of the wires, e.g. first wire 43, and a bidirectional TVS diode (not seen) is connected between first wire 43 and second wire 45. Again, the surge protection circuit 10' of FIG. 2 may be applicable to this example. In some embodiments the components can be enclosed by a casing of the power cord 46 or, alternatively, the power cord 46 can be provided with a bulge or dongle to accommodate the components of the surge protection circuit.

FIG. 6 illustrates additional, power line electrical components, in this case computer power plugs and cords. For example, a female computer power plug 52 (with or without an attached power cord 54) and a male computer power plug 56 (with or without an attached power cord 58), are further non-limiting examples of power line electrical components. The embedded A.C. power line circuitry 10 of FIG. 1 or 10' of FIG. 2 may be suitable for use with either or both of electric plugs 53 and 56 and/or power cords 54 and 58 (potentially with the use of a dongle, not shown). The power line circuitry 10' may fit within plug 52 and/or plug 56 providing additional surge protection for computers drawing power from those plugs. The plugs include insulating members made from plastic, synthetic rubber, ceramics and other suitable materials, as will be appreciated by those of skill in the art, which at least partially house the circuitry 10'.

FIG. 7 illustrates additional power line electrical components, in this case an electric power wall socket 59. In this example, the wall socket 59 has an upper outlet 60 and a lower outlet 62. The embedded A.C. power line circuitry 10' of FIG. 2, by way of non-limiting example, may be suitable for use with upper outlet 60, lower outlet 62, or both. The wall socket 59 may include insulating members made from plastic, synthetic rubber, ceramics and other suitable materials, as will be appreciated by those of skill in the art, which at least partially house the circuitry 10'.

By way of non-limiting example, upper outlet 60 may include socket body 61 having a first electrical socket 63, a second electrical socket 65, a first electrical contact 67 and a second electrical contact 69. In this example, the socket body 61 also includes a ground socket 71.

Disposed within the socket body 61, in this example, is a polymeric positive temperature coefficient (PPTC) resettable fuse (not seen) connecting the first electrical socket 63 to the first electrical contact 67 and a bidirectional TVS diode (not seen) connected between the first electrical socket 63 and the second electrical socket 65. The surge protector circuit 10' of FIG. 2 is applicable to this example.

Figure 8:
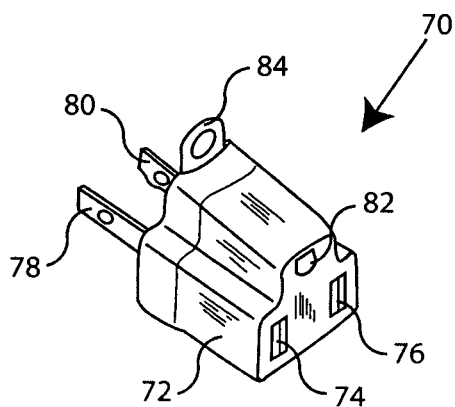
FIG. 8 is a perspective view of an example embedded A.C. power line surge protector A.C. adaptor.

It will be appreciated that the connection of the resettable fuse can also, in another example, be provided between the second electrical socket 65 and the second electrical contact 69 in addition or instead of the previously discussed connection. That is, circuit 10' of FIG. 2 operates regardless of the polarity of the power line. It will also be appreciated that an optional electronic circuit (not seen) including at least one electronic device may be disposed within the socket body 61 and coupled in parallel with the bidirectional TVS diode:

FIG. 8 is a perspective view of an example A.C. plug adaptor 70 with integrated surge protector. In this example, the A.C. plug adaptor 70 includes an adaptor body 72 having a first electrical socket 74, a second electrical socket 76, a first electrical prong 78 and a second electrical prong 80. In this example, the A.C. plug adaptor 70 also includes a ground socket 82 and a ground tab 84 which are electrically connected together.

Disposed within the adaptor body 72, in this example, is a polymeric positive temperature coefficient (PPTC) resettable fuse (not seen) connecting the first electrical socket 74 to the first electrical prong 78 and a bidirectional TVS diode (not seen) connected between the first electrical socket 74 and the second electrical socket 76. The surge protector circuit 10' of FIG. 2 is applicable to this example.

It will be appreciated that the connection of the resettable fuse can also, in another example, be provided between the second electrical socket 76 and the second electrical prong 80 in addition or instead of the previously discussed connection. That is, circuit 10' of FIG. 2 operates regardless of the polarity of the power line. It will also be appreciated that an optional electronic circuit (not seen) including at least one electronic device may be disposed within the adaptor body 72 and coupled in parallel with the bidirectional TVS diode.

Although various embodiments have been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An embedded A.C. power line surge protector comprising:
    a power line electrical component comprising a first input node, a second input node, a first output node, a second output node, and an insulating member at least partially housing the first input node and the second input node, wherein the first input node is electrically connected to the first output node and the second input node is electrically connected to the second output node;
    a TVS diode coupled to the first input node and the second input node and housed within the insulating member; and
    a resettable circuit breaker coupled in series with the TVS diode between the TVS diode and the first input node, the resettable circuit breaker being housed within the insulating member;
    wherein the series-coupled TVS diode and resettable circuit breaker are coupled at a first end to a node between the first input node and first output node and at a second end to a node between the second input node and second output node.

2. An embedded A.C. power line surge protector as recited in claim 1 wherein the insulating member is a gasket configured to engage prongs of a power plug, wherein the gasket includes a plurality of openings through which the prongs of the power plug are extended from a first side of the gasket to a second side of the gasket to allow the prongs of the power plug to physically contact one or more sockets on the second side of the gasket.

3. An embedded A.C. power line surge protector as recited in claim 1 wherein the resettable circuit breaker is a solid state device comprising a polymeric positive temperature coefficient (PPTC) resettable fuse.

4. An embedded A.C. power line surge protector as recited in claim 1 further comprising at least one electronic component coupled in parallel to the TVS diode and housed within the insulating member, wherein the at least one ether electronic component is provided protection from one or more A.C. power line surges by the TVS diode and the resettable circuit breaker.

5. An embedded A.C. power line surge protector as recited in claim 4 wherein the at least one electronic component is connected between the second input node and a node between the TVS diode and the resettable circuit breaker.

6. An embedded A.C. power line surge protector as recited in claim 5 further comprising a current limiter connected in series with the TVS diode and the resettable circuit breaker to the node between the first input node and first output node and the node between the second input node and second output node, wherein the current limiter comprises a resistor.

7. An embedded A.C. power line surge protector as recited in claim 1 wherein the power line electrical component comprises a plug.

8. An embedded A.C. power line surge protector as recited in claim 1 wherein the power line electrical component comprises a socket.

9. An embedded A.C. power line surge protector as recited in claim 1 wherein the power line electrical component comprises a power cord.

10. An embedded A.C. power line surge protector as recited in claim 1 wherein the first input node is one of a line power node and a line neutral node and wherein the second input node is the other of the line power node and the line neutral node.

11. A power line surge protector circuit comprising:
a first input node, a second input node, a first output nod; and a second output node;
a semiconductor shunt having an avalanche breakdown potential, the semiconductor shunt being coupled between the first input node and the second input node, whereby a voltage potential between the first input node and the second input node which is in excess of the avalanche breakdown potential shunts current between the first input node and the second input node; and
a resettable circuit breaker coupled in series with the semiconductor shunt between the first input node and the shunt;
wherein the series-coupled semiconductor shunt and resettable circuit breaker are coupled at a first end to a node between the first input node and first output node and at a second end to a node between the second input node and second output node.

12. A power line surge protector circuit as recited in claim 11 further comprising at least one electronic component coupled in parallel to the semiconductor shunt, wherein the at least one electronic component is provided protection from one or more A.C. power line surges by the semiconductor shunt and the resettable circuit breaker.

13. A power line protector circuit as recited in claim 12 wherein the shunt comprises a pair of unidirectional TVS diodes.

14. A power line protector circuit as recited in claim 12 wherein the shunt comprises a bidirectional TVS diode.

15. A power line surge protector circuit as recited in claim 12, further comprising an insulating member at least partially housing the first input node and the second input node, wherein the first input node is electrically connected to the first output node and the second input node is electrically connected to the second output node, and wherein the at least one electronic component is housed within the insulating member.

16. A power line protector circuit as recited in claim 11 wherein the resettable circuit breaker is a solid state device.

17. A power line protector circuit as recited in claim 16 wherein the solid state device is a polymeric positive temperature coefficient (PPTC) resettable fuse.

18. A surge protection method comprising:
shunting between a first input node and a second input node with a semiconductor device when a voltage potential across the semiconductor device exceeds an avalanche breakdown potential of the semiconductor device; and
opening a connection between the first input node and the semiconductor device with a resettable circuit breaker when a current flowing through the resettable circuit breaker exceeds a circuit breaker trip current, wherein the resettable circuit breaker is connected in series with the semiconductor device between the semiconductor device and the first input node and the series-connected semiconductor device and resettable circuit breaker are coupled at a first end to a node between the first input node and at a second end to a first output node and a node between the second input node and a second output node.

19. A surge protection method as recited in claim 18 wherein the semiconductor device comprises a TVS diode.

20. A surge protection method as recited in claim 19 wherein the TVS diode is a bidirectional TVS diode.

21. A surge protection method as recited in claim 18 wherein the resettable circuit breaker comprises a polymeric positive temperature coefficient (PPTC) device.

22. An A.C. plug adaptor with integrated surge protector comprising:
an adaptor body provided with a first electrical socket, a second electrical socket, a first electrical prong connected to the first electrical socket, and a second electrical prong connected to the second electrical socket;
a resettable circuit breaker connected to the first electrical socket; and
a bidirectional TVS diode connected in series with the resettable circuit breaker between the resettable circuit breaker and the second electrical socket;
wherein the series-connected resettable circuit breaker and bidirectional TVS diode are coupled at a first end to a node between the first electrical socket and first electrical prong and at a second end to a node between the second electrical socket and second electrical prong.

23. An A.C. plug adaptor with integrated surge protector as recited in claim 22 further comprising an electronic circuit including at least one electronic device connected in parallel with the bidirectional TVS diode between the second electrical socket and a node between the resettable circuit breaker and the bidirectional TVS diode, wherein the at least one electronic device is housed within the adaptor body and is provided protection from one or more A.C. power line surges by the bidirectional TVS diode and the resettable circuit breaker.

24. An A.C. plug with integrated surge protector comprising:
a plug body provided with a first electrical contact, a second electrical contact, a first electrical prong connected to the first electrical contact, and a second electrical prong connected to the second electrical contact;
a resettable circuit breaker connected to the first electrical contact; and
a bidirectional TVS diode connected in series with the resettable circuit breaker between the resettable circuit breaker and the second electrical contact;

wherein the series-connected resettable circuit breaker and bidirectional TVS diode are coupled at a first end to a node between the first electrical contact and first electrical prong and at a second end to a node between the second electrical contact and second electrical prong.

25. An A.C. plug with integrated surge protector as recited in claim 24 further comprising an electronic circuit including at least one electronic device connected in parallel with the bidirectional TVS diode between the second electrical contact and a node between the resettable circuit breaker and the bidirectional TVS diode, wherein the at least one electronic device is housed within the plug body and is provided protection from one or more A.C. power line surges by the bidirectional TVS diode and the resettable circuit breaker.

26. An A.C. plug with integrated surge protector as recited in claim 25 wherein the at least one electronic device is housed within the plug body.

27. An A.C. socket with integrated surge protector comprising:
- a socket body provided with a first electrical socket, a second electrical socket, a first electrical contact connected to the first electrical socket, and a second electrical contact connected to the second electrical socket;
- a resettable circuit breaker connected to the first electrical socket; and
- a bidirectional TVS diode connected in series with the resettable circuit breaker between the resettable circuit breaker and the second electrical socket;
- wherein the series-connected resettable circuit breaker and bidirectional TVS diode are coupled at a first end to a node between the first electrical socket and first electrical contact and at a second end to a node between the second electrical socket and second electrical contact.

28. An A.C. socket with integrated surge protector as recited in claim 27 further comprising an electronic circuit including at least one electronic device connected in parallel with the bidirectional TVS diode between the second electrical socket and a node between the resettable circuit breaker and the bidirectional TVS diode, wherein the at least one electronic device is provided protection from one or more A.C. power line surges by the bidirectional TVS diode and the resettable circuit breaker.

29. An A.C. power cord with integrated surge protector comprising:
- a power cord comprising a first wire and a second wire, which extend from an input end of the power cord to an output end of the power cord;
- a resettable circuit breaker connected to the first wire; and
- a bidirectional TVS diode connected in series with the resettable circuit breaker between the resettable circuit breaker and the second wire;
- wherein the series-connected resettable circuit breaker and bidirectional TVS diode are connected between the first and second wires.

30. An A.C. power cord with integrated surge protector as recited in claim 29 further comprising an electronic circuit including at least one electronic device connected in parallel with the bidirectional TVS diode between the second wire and a node between the resettable circuit breaker and the bidirectional TVS diode, wherein the at least one electronic device is provided protection from one or more A.C. power line surges by the bidirectional TVS diode and the resettable circuit breaker.

31. An A.C. plug gasket with integrated surge protector comprising:
- a gasket body provided with a first opening having a first electrical contact and a second opening having a second electrical contact, wherein the gasket body is configured to engage a plurality of prongs of a power plug such that a first prong of the power plug physically contacts the first electrical contact and a second prong of the power plug physically contacts the second electrical contact, and the prongs extend through the openings from a first side of the gasket body to a second side of the gasket body; and
- a resettable circuit breaker and a bidirectional TVS diode coupled in series between the first electrical contact and the second electrical contact;
- wherein the series-connected resettable circuit breaker and bidirectional TVS diode are coupled at a first end to a node between the first prong and first electrical contact and at a second end to a node between the second prong and second electrical contact.

32. An A.C. plug gasket with integrated surge protector as recited in claim 31 further comprising an electronic circuit including at least one electronic device connected in parallel with the bidirectional TVS diode between the second electrical contact and a node between the resettable circuit breaker and the bidirectional TVS diode, wherein the at least one electronic device is housed in the gasket body and is provided protection from one or more A.C. power line surges by the resettable circuit breaker and the bidirectional TVS diode.

* * * * *